(12) United States Patent
Bensmann et al.

(10) Patent No.: US 11,866,170 B2
(45) Date of Patent: Jan. 9, 2024

(54) LEADING-EDGE ARRANGEMENT FOR AN AIRCRAFT

(71) Applicant: Airbus Operations GmbH, Hamburg (DE)

(72) Inventors: Stefan Bensmann, Weyhe (DE); Marcus Erban, Bremen (DE); Martin Fees, Rotenburg (DE)

(73) Assignee: Airbus Operations GmbH, Hamburg (DE)

( * ) Notice: Subject to any disclaimer, the term of this patent is extended or adjusted under 35 U.S.C. 154(b) by 75 days.

(21) Appl. No.: 17/615,068

(22) PCT Filed: Jul. 7, 2020

(86) PCT No.: PCT/EP2020/069110
§ 371 (c)(1),
(2) Date: Nov. 29, 2021

(87) PCT Pub. No.: WO2021/005050
PCT Pub. Date: Jan. 14, 2021

(65) Prior Publication Data
US 2022/0219803 A1 Jul. 14, 2022

(30) Foreign Application Priority Data
Jul. 9, 2019 (DE) .......................... 102019118487.8

(51) Int. Cl.
*B64C 9/02* (2006.01)
*B64C 9/04* (2006.01)
*B64C 13/28* (2006.01)

(52) U.S. Cl.
CPC .................. *B64C 9/02* (2013.01); *B64C 9/04* (2013.01); *B64C 13/28* (2013.01)

(58) Field of Classification Search
CPC .... B64C 9/02; B64C 9/04; B64C 9/16; B64C 9/22; B64C 13/28
See application file for complete search history.

(56) References Cited

U.S. PATENT DOCUMENTS

| 4,650,140 A | 3/1987 | Cole |
| 2009/0127402 A1* | 5/2009 | Jaggard .................... B64C 9/24 244/213 |

(Continued)

FOREIGN PATENT DOCUMENTS

| DE | 102011105912 A1 | 1/2013 |
| EP | 3501977 A1 | 6/2019 |
| WO | 2008110521 A1 | 9/2008 |

OTHER PUBLICATIONS

International Search Report; priority document, Pub Date Oct. 16, 2020.

*Primary Examiner* — Rodney A Bonnette
(74) *Attorney, Agent, or Firm* — Greer, Burns & Crain, Ltd.

(57) ABSTRACT

A movable flow body device for an aircraft including an elongated flow body having a main extension axis, a first mechanical interface in a first position along the main extension axis, a second mechanical interface in a second position and a third mechanical interface in a third position. The first mechanical interface may be a master interface arranged in a central region, while the second and third mechanical interfaces are slave interfaces. Preferably, in the outboard position, a link plate between a support lever and a support rib of the flow body is inverted compared to the further inboard mechanical interface, which allows for supporting slimmer and longer flow bodies in the outboard region and providing a rigging hinge line through the whole flow body.

16 Claims, 3 Drawing Sheets

(56) References Cited

U.S. PATENT DOCUMENTS

| | | |
|---|---|---|
| 2010/0163685 A1 | 7/2010 | Vormezeele et al. |
| 2011/0290946 A1 | 12/2011 | Peirce |
| 2014/0246540 A1 | 9/2014 | Schlipf et al. |
| 2016/0083081 A1* | 3/2016 | Cowles, Jr. ............. F16C 17/10 384/570 |
| 2020/0023937 A1 | 1/2020 | Everaert et al. |

* cited by examiner

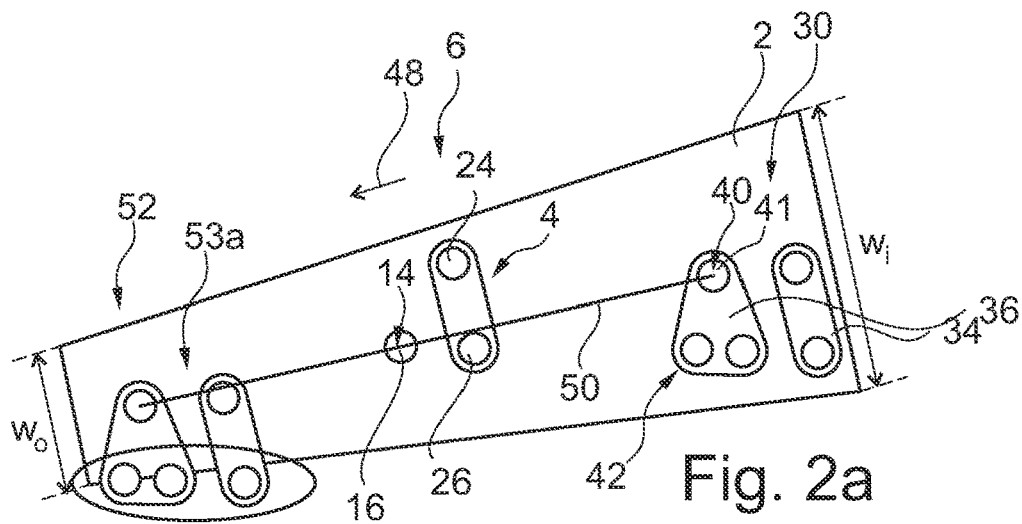
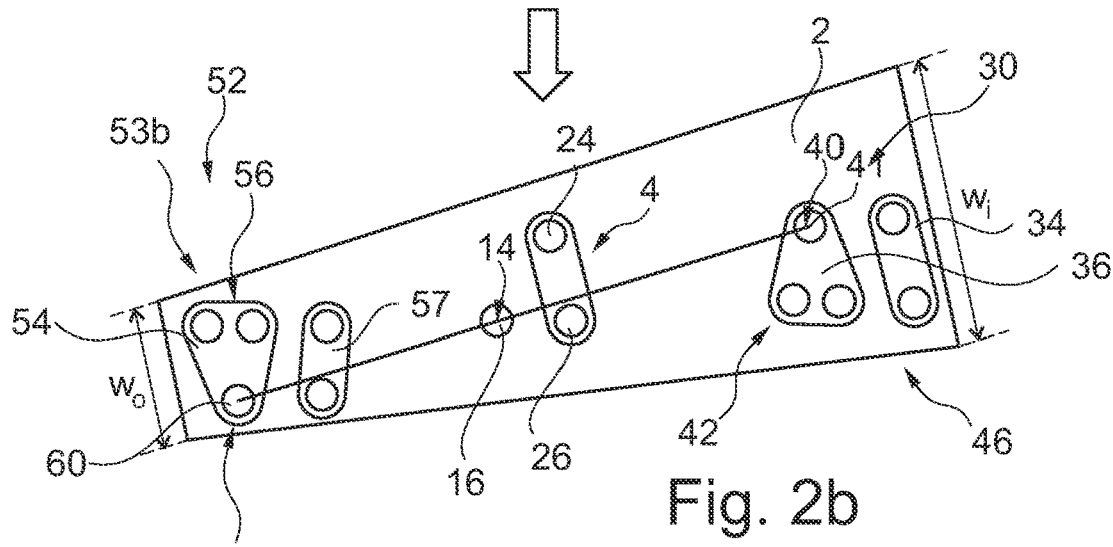
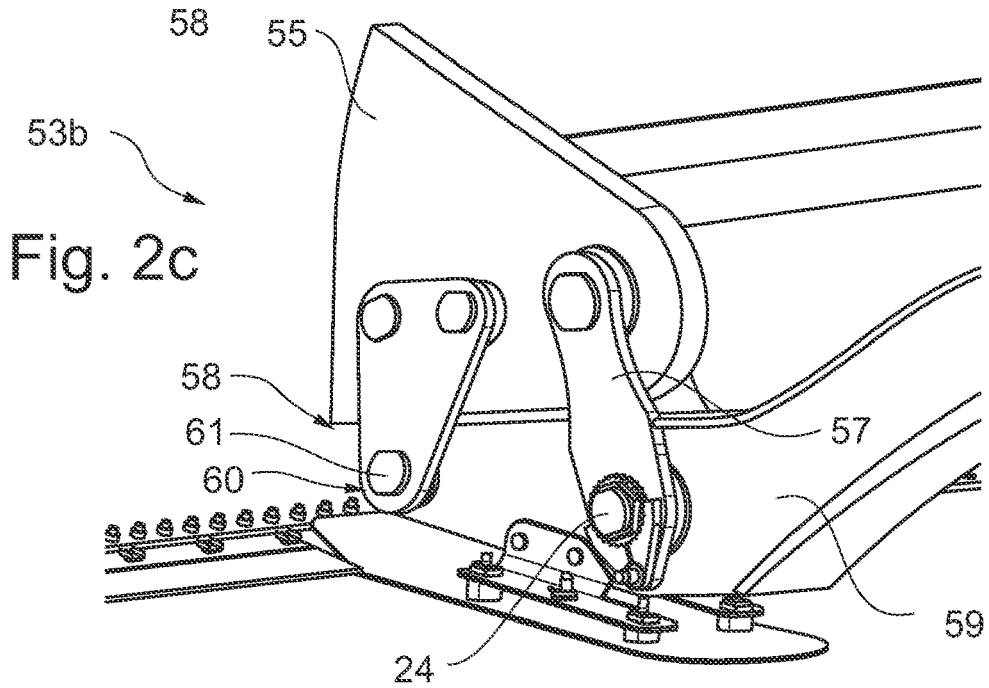

LEADING-EDGE ARRANGEMENT FOR AN AIRCRAFT

CROSS-REFERENCES TO RELATED APPLICATIONS

This application claims the benefit of the International Application No. PCT/EP2020/069110, filed on Jul. 7, 2020, and of the German patent application No. 102019118487.8 filed on Jul. 9, 2019, the entire disclosures of which are incorporated herein by way of reference.

FIELD OF THE INVENTION

The invention relates to a movable flow body device for an aircraft, a wing having such a movable flow body device as well as an aircraft having such a wing.

BACKGROUND OF THE INVENTION

Movable flow bodies, such as leading-edge slats and trailing-edge flaps, are often supported by a drive mechanism on a wing or other parts of an aircraft. The flow body is often moved by a master interface, while slave interfaces serve to support the respective flow body and maintain a certain alignment of the flow body. During installation of the flow body to the aircraft, the alignment needs to be adjusted to compensate manufacturing tolerances. For supporting a flow body on a drive mechanism, often knuckle interfaces are used.

SUMMARY OF THE INVENTION

With known mechanical interfaces, the dimension of the flow bodies is limited by the available space for these. Particularly for outboard positions, a certain minimum height or width of the flow body is required to allow for using a mechanical interface at a sufficiently outboard or end region of the respective flow body.

It is thus an object of the invention to provide an alternate movable flow body device, which enables a larger length, a smaller width, a stronger curvature and/or an improved rigging behavior.

A movable flow body device for an aircraft is proposed, comprising an elongated flow body having a main extension axis, a first mechanical interface coupled with the flow body in a first position along the main extension axis, having a first support component, a second mechanical interface coupled with the flow body in a second position along the main extension axis, having a second support component, and a third mechanical interface coupled with the flow body in a third position along the main extension axis, having a third support component, wherein the first support component, the second support component and the third support component are rigidly attached to the flow body, wherein the first mechanical interface comprises a first swiveling device that is configured to swivably couple a first support lever with the first support component of the first interface to form a first hinge point on the first support component, wherein the second mechanical interface comprises a second swiveling device that is configured to swivably couple a second support lever with the second support component of the second interface to form a second hinge point, wherein the third mechanical interface comprises a third swiveling device that is configured to swivably couple a third support lever with the third support component of the third interface to form a third hinge point, wherein the second swiveling device and the third swiveling device are coupled with the respective support lever through a link plate, wherein the link plates coupled with the second and third support levers comprise orientations relative to the respective support components or the respective support levers that are inverted relative to each other to shift one of the second hinge point and the third hinge point transverse to the main extension axis relative to the respective support lever, and wherein the first hinge point, the second hinge point and the third hinge point define a straight hinge line that extends along the first, second and third positions of the flow body.

The flow body is to be understood as a component that is movably supported on an aircraft for the purpose of enhancing the aerodynamic characteristics of the aircraft. For example, the flow body may be a movable leading-edge device, such as a slat, a flap, a droop nose or a similar device. However, the flow body may also be a trailing-edge device, such as a movable flap. Such a flap may be a high-lift flap that is to be moved on a more or less complex motion path. The trailing-edge device may also include an aileron that is simply rotatably supported on a fixed hinge line. However, mixed forms, such as realized in the form of flaperons, are possible. It is to be understood that the extension of the flow body along the main extension axis clearly exceeds the extension in other spatial directions. Thus, the flow body is elongated.

The flow body may comprise a substantially surface-like shape or it may comprise a more complex three-dimensional shape with an internal stiffening structure and at least one skin that surrounds the respective stiffening structure. For coupling the respective flow body with a drive mechanism, mechanical interfaces are provided. In a general embodiment these may include the first, second and third mechanical interfaces. For the sake of better understanding, the movable flow body device includes the components, interfaces and parts to be attached to the drive mechanism of the aircraft. The drive mechanism exemplarily includes a first, a second and a third support lever, which provide the desired motion and hold the flow body in all desired positions.

All mechanical interfaces comprise a support component, which is rigidly attached to the flow body. By rigidly attaching the support components, an attachment point, where a drive mechanism is swivably couplable, is thus provided in a fixed spatial relationship to the flow body. Thus, the first mechanical interface comprises a first swiveling device, which is configured to receive a part of a first support lever, which is a part of a drive mechanism, to form a first hinge point. When attaching such a first support lever to the first swiveling device, the first mechanical interface is coupled with the first support lever. In this case, the first swiveling device is directly coupled with the first support component.

It is to be understood that the flow body is not intended to freely swivel around the hinge points or the hinge line in general during the normal operation of the aircraft. Instead, the flow body is supposed to maintain a fixed spatial relationship to the drive mechanism. Consequently, at least a further element is required on each mechanical interface to align the flow body relative to the drive mechanism as desired and to fix such an alignment. The hinge line thus merely allows for providing a holding function free of constraint stresses and allows to adjust the alignment between the flow body and the mechanical interfaces by rotating around the hinge line and fix a rotational position.

The design and setup of the second mechanical interface and of the third mechanical interface is very similar to the first mechanical interface. However, the second support lever and the third support lever are coupled with the respective second or third support component through a link plate. This may, for example, enable a compensations motion between the respective support component and the respective support lever in a direction of the main extension axis. The first, second and third hinge points span the hinge line to extend through along the first, second and third positions.

By inverting the orientation of one of the link plates a distinct shifting of the second or third hinge point relative to the respective support lever can be accomplished. One of the second or third support levers may thus be arranged on one side of the associated hinge point, while the other of the second or third support levers may be arranged on another side of the associated hinge point. This allows to include the shifted hinge point into a region with a very narrow end that would otherwise not allow to receive a mechanical interface with a hinge point. The hinge line and a connecting line between all support components or support lever ends may thus enclose an angle with the hinge line that is not zero. By shifting the respective hinge point outwardly, e.g., in terms of a chordwise direction of the flow body, the respective mechanical interface may be placed in a lateral outboard position of a tapered end of a slim flow body. Consequently, the movable flow body device according to the invention allows longer and/or more tapered and/or slimmer flow bodies, while maintaining the same adjustability.

For the sake of completeness, it is indicated that the terms "first", "second" and "third" are not to be interpreted as an order from an inboard to an outboard location or such. These terms are only used to distinguish the different components independent of their locations.

In a preferred embodiment, the link plate comprises an attachment end and a support end, wherein the attachment end is attached to one of the respective support lever and the respective support component, wherein the support end is attached to the other one of the respective support lever and the respective support component, wherein the attachment end comprises at least two flexible attachment points for attaching the link plate to maintain a desired orientation, and wherein the support end comprises a single flexible attachment point for attaching the link plate to allow a swiveling motion. The flexibility of the attachment points may be achieved by spherical bearings or other devices that allow a slight motion of the link plate to allow for a displacement between the respective support lever and the respective support component. It is particularly preferred that the link plate is allowed to slightly swivel around a hinge axis created by a connection line between the two attachment points on the attachment end. If, for example, the flow body conducts a thermal expansion, the flexible attachment points allow a slight displacement of the respective support levers and support components.

Furthermore, in an advantageous embodiment the attachment end of one of the link plates is connected to the respective support lever, wherein the attachment end of the other one of the link plates is connected to the respective support component. Hence, the inversion of the link plates is realized by attaching the link plates in an inverted manner on the respective support levers. While one of the link plates allows to shift the respective hinge point to the support lever itself, the other one of the link plates determines the respective hinge point on the respective support component. In case both support levers are arranged on the same side of the support components, the shift in the hinge point position is simply conducted by turning the link plate into an inverted orientation, e.g., upside down.

In a further advantageous embodiment, the arrangement of the second support lever and the second support component as well as of the third support lever and the third support component are inverted relative to each other in a direction transverse to the main extension axis. Hence, a relative position of the second or third support lever to their respective support component is swapped. This may also include an inverted orientation of the respective link plate, such that one link plate may be attached with its attachment end to a support lever, while another link plate may be attached with its attachment end to a support component. However, all link plates may be attached to the support levers with their attachment ends or, as an alternative, all link plates may be attached to the support components with their attachment ends. The inversion of the relative position of the support levers and/or the inversion of the link plate orientations increase the flexibility of choosing a hinge point position.

An advantageous embodiment further comprises a first link, a second link and a third link, wherein each of the support levers are coupled with one end of one of the links, wherein the respective other ends are coupled with the respective support component in a distance to the respective swiveling device. The links provide for maintaining a fixed spatial relationship between the flow body and the respective support levers. For example, the first link extends between the first support component to the first support lever in a distance to the first swiveling device in order to form a triangle between the first swiveling device and both ends of the first link. By adjusting the length or the coupling positions of the links the alignment of the flow body to the support levers and therefore also the adjustment of the flow body to the surrounding components on the aircraft in the installed state is adjusted. For example, a trailing edge of the flow body may be adjusted to a fixed leading edge of a wing. It is desired to provide a tension-free state of the flow body and the support levers, while the position of the flow body fulfills the requirements regarding the aerodynamic requirements in at least one state of the flow body, e.g., the retracted state. This adjustment is a rigging process, which may be conducted during installation of the flow body. During the rigging process, the flow body locally swivels around the hinge axis or the respective hinge point in the vicinity of the respective link, when it is adjusted.

Still further, the first mechanical interface may be a master interface and the second and third mechanical interfaces are slave interfaces.

Preferably, the support components are realized as support ribs attached to an interior skin of the flow body and comprising a lug or hole for coupling with the respective support lever. This is particular useful for e.g., leading-edge slats or trailing edge flaps, as they may already comprise an internal stiffening structure having ribs and a skin surrounding the ribs. The support component in the form of a support rib may be designed so as to protrude from the interior of the respective flow body, thus providing a lug or hole to receive a coupling feature.

Preferably, the mechanical interfaces comprise knuckle joints. The knuckle joints are proven reliable and safe measures for joining swivable components. Preferably, the first support lever encloses the first support component by two substantially identical sections in a plier-like manner. In the second and third mechanical interfaces two link plates enclose the second or third support lever. Two links that enclose the respective support lever and the respective support component may be used for each support lever to provide the desired connection. A radial adjustment may be provided by using a set of rotatable elements with an eccentric hole. By rotation of one of the elements, the eccentric hole can be selectively repositioned, in order to provide a radial adjustment. For example, the hole may determine a hinge point or a hinge axis. It is to be understood that the rotated position of one of the components may be locked by appropriate features to permanently fix it.

According to a preferred embodiment, a width of the flow body changes along the main extension direction wherein one of the second and third attachment positions is in a region of the smallest width, and wherein the first attachment position is arranged in a distance thereto along the main extension direction. The arrangement of the second mechanical interface in the region of the smallest width clearly enables a further reduction of the width in comparison to common flow body devices.

It is preferred if the first attachment position is a center position between the second attachment position and the third attachment position. Hence, both mechanical interfaces having link plates are arranged outside the center. By shifting the hinge point of one of these the hinge line may be aligned to fit into slimmer and narrower flow bodies.

Preferably, the main extension direction is a spanwise direction, wherein the flow body tapers in an outboard direction, and wherein the third mechanical interface is arranged in an outboard region. Thus, an outboard dimension of the flow body may be designed to be as small as possible. By providing the design according to the invention the third swiveling device is easier to realize and the outboard region of the flow body is easier to support.

As explained further above, preferably the attachment points of the link plates are designed for allowing the respective support component and support lever to laterally shift relative to each other.

The invention further relates to a wing having a fixed wing component, at least one flow body device according to the above description and a drive mechanism having at least a first support lever, a second support lever and a third support lever, wherein the at least one flow body device is coupled with the first support lever, the second support lever and the third support lever. As stated further above, the first support lever and the second support lever are a part of the drive mechanism and are driven through a drive unit for extending or retracting the respective flow body.

Furthermore, the flow body may comprise at least one of a leading-edge high-lift device and a trailing-edge high-lift device.

Finally, the invention relates to an aircraft having two wings according to the above or at least one flow body device according to the above description.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

FIG. 2a shows an illustration of a tapered flow body with a schematic view of a common mechanical interface.

FIG. 2b shows the illustration of FIG. 2a with a modified second mechanical interface.

FIG. 2c shows a view of a third mechanical interface.

DETAILED DESCRIPTION OF THE PREFERRED EMBODIMENTS

Figure 1A:
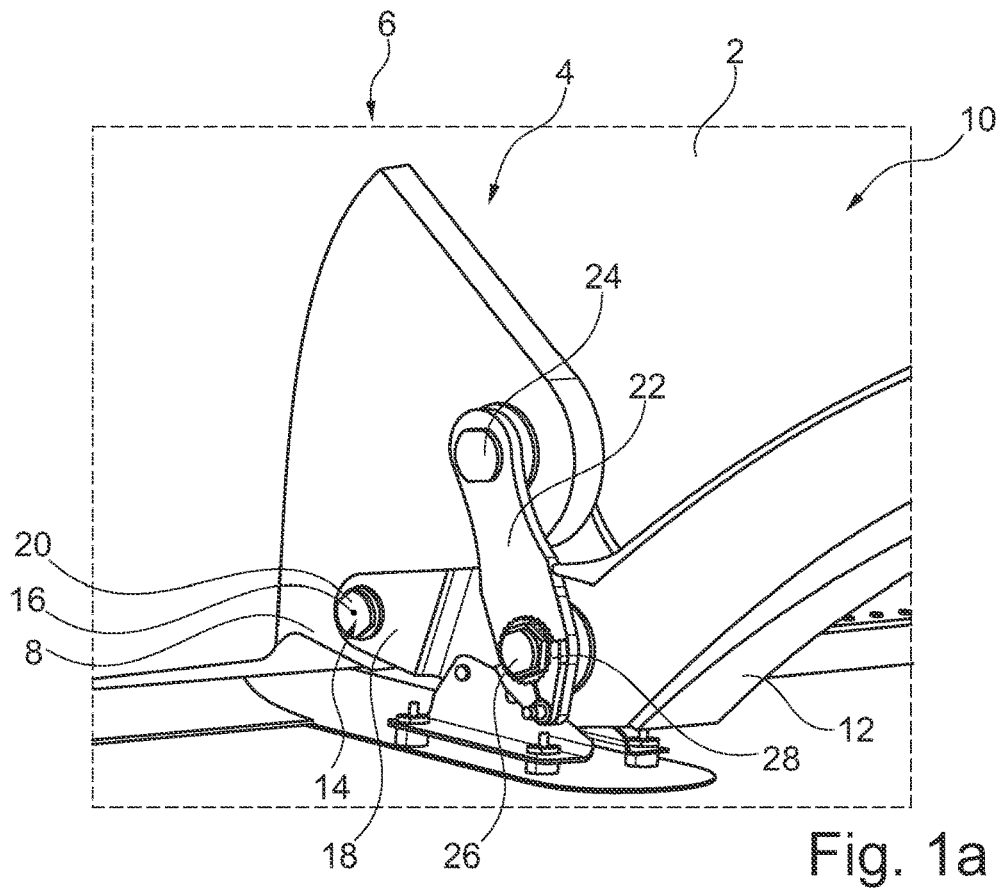
FIGS. 1a and 1b show two mechanical interfaces in a flow body.

FIG. 1a shows an interior side of a flow body 2 with a first mechanical interface 4 coupled with the flow body 2 in a first position 6. Exemplarily, the first position 6 is a center position, which is located in the region of a center along a main extension axis, which is a spanwise axis in this case. In this exemplary embodiment, the first mechanical interface 4 comprises a first support component 8, which is a support rib attached to the skin 10 of the flow body 2. A first support lever 12, which is a part of a drive mechanism, is coupled with the first support component 8 by means of a first swiveling device 14, which provides a first hinge point 16 that extends through the first support component 8. For example, the first support component 8 comprises a through-hole, while the first support lever 12 comprises two parallel webs 18 at a distance to each other for enclosing the first support component 8. A bolt 20 or a similar component extends through both webs 18 and the first support component 8 to provide the first swiveling device 14. Due to the direct coupling between the first support lever 12 and the first support component 8, a lateral shift between the first support component 8 and the first support lever 12 is prevented. Thus, the first mechanical interface 4 may thus be considered a master interface.

For maintaining a desired rotational alignment between the first support lever 12 and the first support component 8 around the first hinge point 16, a first link 22 is provided. It is both coupled with the first support component 8 and the first support lever 12. The first link 22 is arranged in a distance to the first swiveling device 14 and extends between a first link joint 24 and a second link joint 26. At the second link joint 26, a radial adjustment can be accomplished. For this purpose, the second link joint 26 is eccentric. A lock 28 is provided for locking the radial adjustment. Hence, by adjusting the second link joint 26, the effective length of the first link 22 can be adjusted, which in turn adjusts the alignment of the flow body 2 relative to the first support lever 12. Thus, the flow body 2 is locally rigged on the first mechanical interface 4.

Figure 1B:
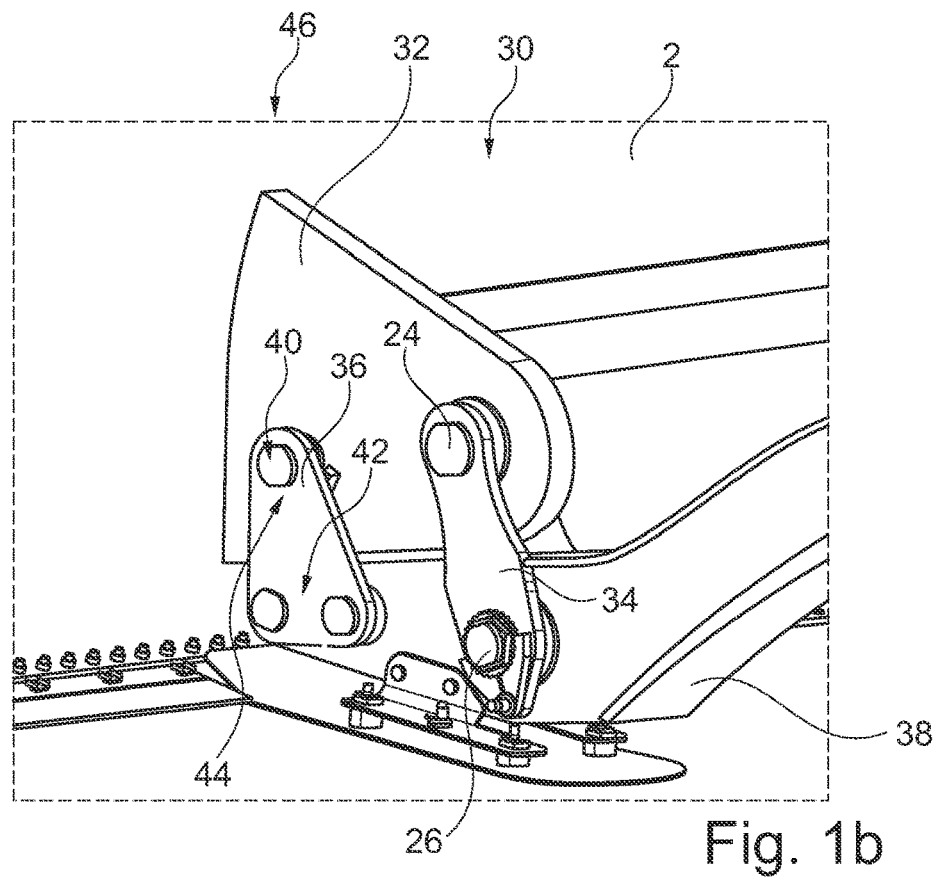

In FIG. 1b, a second mechanical interface 30 in the form of a slave interface is shown. Here, a second support component 32 is provided, which is coupled with a second link 34 at a first link joint 24 as well as a link plate 36, which is flexibly attached to a second support lever 38 and swivably and flexibly coupled with a second swiveling device 40 at the second support component 32. The second swiveling device 40 determines a second hinge point.

The link plate 36 comprises an attachment end 42 and a support end 44. While the attachment end 42 is flexibly attached to the second support lever 38, such as by using spherical bearings, the support end 44 carries a second swiveling device 40. Here, the support end 44 may also comprise a spherical bearing for allowing a motion flexibility.

Spherical bearings for coupling the link plate 36 with the second support components 32 and the second support lever 38 allow a lateral shift between the second support component 32 and the second support lever 38. Thus, in case of thermal expansion or other effects, the first mechanical interface 4 maintains a lateral position between the first support lever 12 and the first support component 8 in a lateral direction, while the second mechanical interface 30 is able to conduct a compensation motion between the second support component 32 and the second support lever 38 in a lateral direction.

Again, the second link 34 is swivably coupled with the second support lever 38, while it can be adjusted in a radial direction through the second link joint 26. Hence, the alignment of the flow body 2 can also be rigged relative to the second support lever 38.

As an example, the second mechanical interface 30 is provided at a second position 46, which is preferably further inboard or at a position with a largest width of the flow body 2. It is to be understood that the flow body 2 tapers in a spanwise direction, such that an outboard width is clearly smaller than an inboard width.

FIGS. 2a and 2b show the flow body 2 in a top view with very schematic illustrations of the mechanical interfaces. The first mechanical interface 4 is arranged in a central region of the flow body 2 along a spanwise direction 48. Here, it is clearly apparent that a width w decreases from an inboard width wi to an outboard width wo. At an inboard location, the second mechanical interface 30 is provided. Here, the second swiveling device 40 is arranged in an upper portion in the drawing plane. An attachment end 42 of the link plate 36 is provided in a bottom region in the drawing plane. The first swiveling device 14 and the second swiveling device 40 intersect with a hinge line 50, which corresponds to a hinge for adjusting the alignment of the flow body 2, i.e., for rigging the flow body 2.

In a further outboard position 52, which is considered the third position 52, a theoretical third mechanical interface 53a equal to the second mechanical interface 30 is provided. It is clearly apparent, that the attachment end 42 of the link plate 36 would not fit into the flow body 2.

As demonstrated in FIG. 2b, a modified third mechanical interface 53b can used instead. Here, an inverted link plate 54 is provided, which has an attachment end 56 and a support end 58, which are inversely arranged compared to the link plate 36 of the second mechanical interface 30. Thus, the link plate 54 is attached with an upper end in the drawing plane and a third swiveling device 60 is arranged at a bottom region. The third swiveling device 60 determines a third hinge point 61. Consequently, the hinge line 50 is able to also intersect the third swiveling device 60 by providing the inverted link plate 54. This allows for a slimmer, longer and/or more curved flow body 2. As a result, the hinge line 50 may comprise a slightly changed angle relative to the spanwise direction 48.

For better understanding, FIG. 2c demonstrates another view onto the third mechanical interface 53b. Here, a third support component 55, a third link 57 and a third support lever 59 are shown. These are coupled with each other as in the second mechanical interface 30. However, the link plate 54 of the third mechanical interface 53b is inverted relative to the third support component 55 compared to the second mechanical interface 30. Thus, the link plates 36 and 54 coupled with the second support lever 38 and third support lever 59 comprise different orientations relative to the respective support components 32 and 55 to shift the third hinge point 61 transverse to the main extension axis relative to the respective support lever 59.

Figure 3:
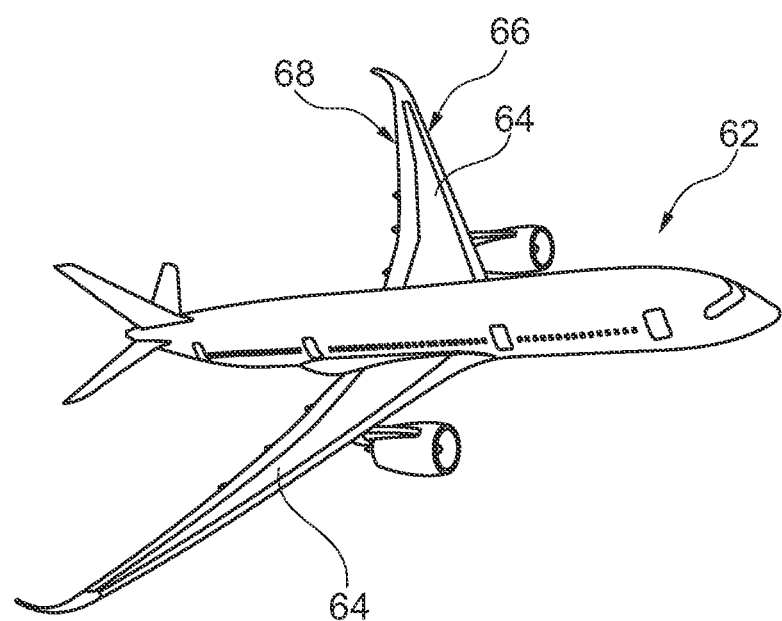
FIG. 3 shows an aircraft.

Finally, FIG. 3 shows an aircraft 62 with wings 64, having leading-edge devices 66 and trailing-edge devices 68. Exemplary, one of the leading edge devices 66 and the trailing edge devices 68 comprise a flow body 2 according to the above description.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 flow body
4 first mechanical interface
6 first position
8 first support component
10 skin
12 first support lever
14 first swiveling device
16 first hinge point
18 web
20 bolt
22 first link
24 first link joint
26 second link joint
28 lock
30 second mechanical interface
32 second support component
34 second link
36 link plate
38 second support lever
40 second swiveling device
41 second hinge point
42 attachment end
44 support end
46 second position
48 spanwise direction
50 hinge line
52 third position/outboard position
53a (theoretical) third mechanical interface
53b third mechanical interface
54 link plate
55 third support component
56 attachment end
57 third link
58 support end
59 third support lever
60 third swiveling device
61 third hinge point
62 aircraft
64 wing
66 leading-edge device
68 trailing-edge device w width
w_i inboard width
w_o outboard width

The invention claimed is:

1. A movable flow body device for an aircraft, comprising:
   an elongated flow body having a main extension axis,
   a first mechanical interface coupled with the flow body in a first position along the main extension axis, having a first support component,
   a second mechanical interface coupled with the flow body in a second position along the main extension axis, having a second support component, and
   a third mechanical interface coupled with the flow body in a third position along the main extension axis, having a third support component,
   wherein the first support component, the second support component and the third support component are rigidly attached to the flow body,
   wherein the first mechanical interface comprises a first swiveling device that is configured to swivably couple a first support lever with the first support component of the first mechanical interface to form a first hinge point on the first support component,
   wherein the second mechanical interface comprises a second swiveling device that is configured to swivably couple a second support lever with the second support component of the second mechanical interface to form a second hinge point,
   wherein the third mechanical interface comprises a third swiveling device that is configured to swivably couple a third support lever with the third support component of the third mechanical interface to form a third hinge point,
   wherein the second swiveling device and the third swiveling device are coupled with the second support lever and third support lever, respectively, through a respective link plate,
   wherein the link plates coupled with the second support lever and third support lever comprise orientations relative to the respective support components or the respective support levers that are inverted relative to each other to shift one of the second hinge point and the third hinge point transverse to the main extension axis relative to the respective support lever, and
   wherein the first hinge point, the second hinge point and the third hinge point define a straight hinge line that extends along the first, second and third positions of the flow body.

2. The flow body device according to claim 1,
   wherein the link plates comprises an attachment end and a support end,
   wherein the attachment ends are attached to one of the respective support levers and the respective support component,
   wherein the support ends are attached to the other one of the respective support lever and the respective support component,
   wherein the attachment ends comprises at least two flexible attachment points for attaching the link plate to maintain a desired orientation, and
   wherein the support ends comprise a single flexible attachment point for attaching the link plate to allow a swiveling motion.

3. The flow body device according to claim 2,
   wherein the attachment end of one of the link plates is connected to the respective support lever, and
   wherein the attachment end of the other one of the link plates is connected to the respective support component.

4. The flow body device according to claim 2,
   wherein an arrangement of the second support lever and the second support component as well as of the third support lever and the third support component are inverted relative to each other in a direction transverse to the main extension axis.

5. The flow body device according to claim 2, wherein the attachment points are configured to allow the respective support component and support lever to laterally shift relative to each other.

6. The flow body device according to claim 1,
   further comprising a first link, a second link and a third link,
   wherein each of the support levers is coupled with one end of one of the first, second and third links,
   wherein the respective other ends of the links are coupled with the respective support component in a distance to the respective swiveling device.

7. The flow body device according to claim 1,
   wherein the first mechanical interface is a master interface, and
   wherein the second and third mechanical interfaces are slave interfaces.

8. The flow body device according to claim 1, wherein the support components are realized as support ribs attached to an interior skin of the flow body and comprising a lug or hole for coupling with the respective support lever.

9. The flow body device according to claim 1, wherein the mechanical interfaces comprise knuckle joints with a radial adjustment.

10. The flow body device according to claim 1,
    wherein a width of the flow body changes along the main extension direction, wherein one of the second and third attachment positions is in a region of the smallest width, and
    wherein the first attachment position is arranged in a distance thereto along the main extension direction.

11. The flow body device according to claim 10, wherein the first attachment position is a center position between the second attachment position and the third attachment position.

12. The flow body device according to claim 10,
    wherein the main extension direction is a spanwise direction,
    wherein the flow body tapers in an outboard direction, and
    wherein the third mechanical interface is arranged in an outboard region.

13. A wing comprising
    a fixed wing component,
    at least one flow body device according to claim 1, and
    a drive mechanism having at least a first support lever, a second support lever and a third support lever,
    wherein the at least one flow body device is coupled with the first support lever, the second support lever and the third support lever.

14. The wing according to claim 13, wherein the flow body comprises at least one of a leading-edge high-lift device and a trailing-edge high-lift device.

15. An aircraft having two wings according to claim 13.

16. An aircraft having at least one flow body device according to claim 1.

* * * * *